United States Patent
Isogai et al.

(10) Patent No.: US 6,889,140 B2
(45) Date of Patent: May 3, 2005

(54) COLLISION AVOIDANCE CONTROL SYSTEM FOR VEHICLE

(75) Inventors: Akira Isogai, Anjo (JP); Eiji Teramura, Okazaki (JP); Takao Nishimura, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/786,078

(22) Filed: Feb. 26, 2004

(65) Prior Publication Data

US 2004/0199327 A1 Oct. 7, 2004

(30) Foreign Application Priority Data

Feb. 27, 2003 (JP) ........................................ 2003-051286

(51) Int. Cl.[7] .............................. G06G 7/78; G06F 17/10
(52) U.S. Cl. ....................... 701/301; 340/435; 340/903; 342/71; 180/167; 180/271; 180/170
(58) Field of Search .......................... 701/301, 96, 70, 701/117; 340/435, 903, 436, 902, 441; 342/70, 71, 72, 73, 77, 107, 455, 29, 104, 109; 180/271, 167, 175, 274, 275, 170, 282; 101/96, 301

(56) References Cited

U.S. PATENT DOCUMENTS

| | | | | |
|---|---|---|---|---|
| 5,473,538 A | | 12/1995 | Fujita et al. ................... 342/70 |
| 6,031,484 A | * | 2/2000 | Bullinger et al. .............. 342/72 |
| 6,044,321 A | * | 3/2000 | Nakamura et al. ............. 701/96 |
| 6,294,987 B1 | * | 9/2001 | Matsuda et al. ............ 340/436 |
| 6,554,089 B2 | * | 4/2003 | Sato et al. ................... 180/169 |
| 6,567,748 B2 | * | 5/2003 | Matsuno ..................... 701/301 |
| 6,624,747 B1 | * | 9/2003 | Friederich et al. .......... 340/436 |
| 6,696,929 B2 | * | 2/2004 | Igaki et al. ................. 340/435 |
| 2002/0026276 A1 | * | 2/2002 | Hattori et al. ................ 701/96 |
| 2004/0024529 A1 | * | 2/2004 | Ibrahim ...................... 701/301 |
| 2004/0102889 A1 | * | 5/2004 | Ibrahim ...................... 701/96 |

FOREIGN PATENT DOCUMENTS

| | | |
|---|---|---|
| JP | 5-181529 | 7/1993 |
| JP | 8-132996 | 5/1996 |
| JP | 11-66495 | 3/1999 |

* cited by examiner

Primary Examiner—Thomas G. Black
Assistant Examiner—Tuan C To
(74) Attorney, Agent, or Firm—Posz Law Group PLC (57) ABSTRACT

A collision avoidance control system for a vehicle is provided which is designed to determine a target collision avoidance deceleration required for a system vehicle equipped with this system to bring a relative speed between the system vehicle and a target object into agreement with substantially zero without a physical collision with the target object and to determine a possibility of collision with the target object as a function of the target collision avoidance deceleration. When the possibility of collision is higher than a given threshold level, the system starts to decelerate the system vehicle. This enables the avoidance of collision with the target object at a decreased operation load on the system.

16 Claims, 6 Drawing Sheets

COLLISION AVOIDANCE CONTROL SYSTEM FOR VEHICLE

BACKGROUND OF THE INVENTION

1. Technical Field of the Invention

The present invention relates generally to a collision avoidance control system which works to initiate collision avoidance action when the danger of possible collision with a target present ahead of a vehicle is encountered.

2. Background Art

Automotive collision monitor systems are known which work to estimate stopping distances of a system-equipped vehicle and a target preceding vehicle traveling ahead of the system-equipped vehicle and locations of the system-equipped vehicle and the target preceding vehicle after the elapse of a preset time to determine the danger of possible collision with the target preceding vehicle based on the stopping distances and the locations. For instance, Japanese Patent First Publication No. 08-132996 teaches such estimation of the stopping distances. Japanese Patent First Publication No. 05-181529 (corresponding to U.S. Pat. No. 5,473,538) teaches such estimation of locations of the system-equipped vehicle and the target preceding vehicle.

It is, however, impossible for the above systems to determine the degree of deceleration to be produced in an automatic braking device of the system vehicle to avoid collision with the preceding vehicle based on the determination of the danger of possible collision. The systems, thus, need to perform an additional operation to determine a control variable to decelerate the system-equipped vehicle.

Japanese Patent First Publication No. 11-066495 teaches a collision avoidance control system which uses an intervehicle distance between the system-equipped vehicle and the target preceding vehicle, a relative speed between the system-equipped vehicle and the target preceding vehicle, a minimum distance to be reserved between the system-equipped vehicle and the target preceding vehicle, acceleration of the target preceding vehicle, and a preset deceleration of the system-equipped vehicle to derive a quadratic function in terms of conditions required to avoid accidental collision with the target preceding vehicle and determines the possibility of the collision using a parabola, as represented by the quadratic function. Specifically, this system increases the preset deceleration of the system-equipped vehicle cyclically and determines the possibility of the collision based on the orientation of the parabola, an inclination of a straight segment of the parabola, coordinates of the straight segment of the parabola, and a predefined parabola determining equation in each cycle to bring a target deceleration used in deceleration control into agreement with a value of the preset deceleration when it is determined that there is almost no possibility of the collision.

The system, however, has the drawback in that many mathematical operations are needed to determine the possibility of collision, thus resulting in a control lag.

The system also has an additional drawback in that when a range within which the preset deceleration is changed is fixed, it causes an operation load on the system to increase with a decrease in cyclic change in the preset deceleration, thus resulting in the need for limiting the magnitude of the cyclic change in the preset deceleration. Specifically, it is difficult to determine the target deceleration as a continuously changing value, thus resulting in a difficulty in improving the accuracy of the deceleration control.

SUMMARY OF THE INVENTION

It is therefore a principal object of the invention to avoid the disadvantages of the prior art.

It is another object of the invention to provide a collision avoidance control system designed to determine the possibility of collision with an obstacle or a control variable used to avoid such collision accurately at a decreased operation load.

According to one aspect of the invention, there is provided a collision avoidance control system which may be employed in automotive vehicles to avoid accidental collision with obstacles such as vehicles running ahead. The collision avoidance control system comprises: (a) a collision avoidance deceleration determining circuit working to determine a target collision avoidance deceleration required for a system vehicle equipped with this system to bring a relative speed between the system vehicle and a target object present ahead of the system vehicle into agreement with substantially zero without a physical collision with the target object; and (b) a control circuit working to determine a possibility of collision with the target object as a function of the target collision avoidance deceleration. When the possibility of collision is higher than a given threshold level, the control circuit performs a predetermined collision avoidance operation.

Specifically, the collision avoidance control system is so designed as to determine the degree of deceleration required to avoid the collision with the target object without estimating, like the conventional systems, the distance to the target object and locations of the system vehicle and the target object after the elapse of a set time. The determination of danger of possible collision with the target object is based on the magnitude of the target collision avoidance deceleration. The target collision avoidance deceleration is also used as a control variable for avoiding the collision with the target object. The control variable is derived as a continuously variable value. In other words, the deceleration required for the system vehicle to avoid the collision with the target object is calculated accurately at a decreased operation load on the system.

In the preferred mode of the invention, the collision avoidance deceleration determining circuit determines the target collision avoidance deceleration G according to an equation below $$G = Vr^2 / \{2 \times (D - Dfin)\} - Ka \times Af$$

where Vr is the relative speed between the system vehicle and the target object, D is a distance to the target object, Dfin is a minimum distance to the target object that is to be reserved when the relative speed Vr becomes zero (0), Af is acceleration of the target object, and Ka is a gain ($0 \leq Ka \leq 1$).

The collision avoidance deceleration determining circuit may decrease at least one of the minimum distance Dfin and the gain Ka as the distance D increases.

The collision avoidance deceleration determining circuit may also decrease at least one of the minimum distance Dfin and the gain Ka as one of a speed of the system vehicle and the relative speed Vr decreases.

The collision avoidance deceleration determining circuit may further decrease at least one of the minimum distance Dfin and the gain Ka as an intervehicle time ($=D/Vm$) derived by dividing the distance D by a speed Vm of the system vehicle and/or approach time ($=D/|Vr|$) derived by dividing the distance D by the relative speed Vr increase.

Specifically, when the minimum distance Dfin and the distance D to the target object are great sufficiently or when the speed Vm of the system vehicle or the relative speed Vr are small sufficiently, that is, when it is possible for a vehicle operator to turn a steering wheel to avoid the collision with the target object easily, the target collision avoidance deceleration G is lowered, thereby avoiding the deceleration of the system vehicle with which the vehicle operator feels uncomfortable.

When the target collision avoidance deceleration exceeds a preselected alarm activating threshold value, the control circuit may activate an alarm to output an alarm signal. When the target collision avoidance deceleration decreases below a preselected alarm deactivating threshold value, the control circuit may deactivate the alarm to stop the alarm signal.

The collision avoidance control system may further comprise a travel control apparatus such as an adaptive cruise control (ACC) system which works to determine a target acceleration as functions of a distance to the target object and the relative speed and to decelerate or accelerate the system vehicle based on the target acceleration to control a travel condition of the system vehicle. In this case, the alarm activating threshold value is preferably set to a maximum deceleration controllable by the travel control apparatus.

When the target collision avoidance deceleration exceeds a preselected deceleration control activating threshold value, the control circuit may perform deceleration control to decelerate the system vehicle. When the target collision avoidance deceleration decreases below a preselected deceleration control deactivating threshold value, the control circuit may deactivate the deceleration control.

The deceleration control activating threshold value may be set greater than a maximum deceleration controllable by the travel control apparatus.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
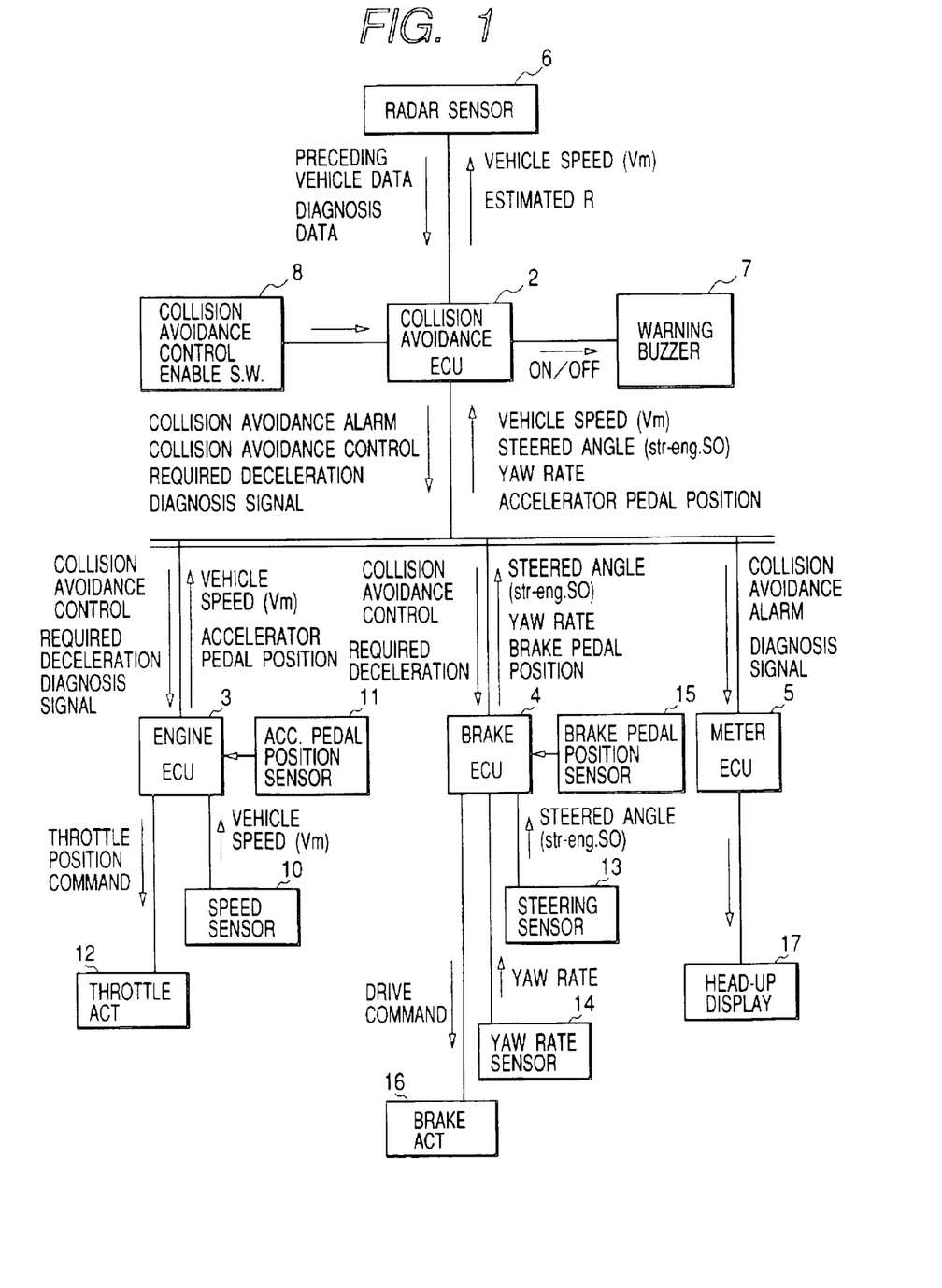
FIG. 1 is a block diagram which shows a collision avoidance control system according to the invention.

Referring now to the drawings, wherein like reference numbers refer to like parts in several views, particularly to FIG. 1, there is shown a collision avoidance control system according to the invention which may be employed in automotive vehicles to avoid accidental collisions with obstacles such as preceding vehicles running ahead. The following discussion will refer to, as an example, use in automotive vehicles. The collision avoidance control system consists essentially of a collision avoidance electronic control unit 2 (will also be referred to as a collision avoidance ECU below), an engine electronic control unit (will also be referred to as an engine ECU below) 3, a brake electronic control unit 4 (will also be referred to as a brake ECU below), and a meter electronic control unit 5 (will also be referred to as a meter ECU below) which are coupled to each other through a LAN communications bus. Each of the ECUs 2, 3, 4, and 5 is implemented by a typical microcomputer equipped with a bus controller for establishing data communications through the LAN communications bus. The data communications are achieved in a Controller Area Network (CAN) communication protocol proposed by Robert Bosch in Germany.

The collision avoidance ECU 2 also connects with a radar sensor 6, a warning buzzer 7, and a collision avoidance control enable switch 8. The collision avoidance control enable switch 8 is an on-off switch for turning on or off the collision avoidance ECU 2.

The radar sensor 6 is implemented by a typical laser radar made of an electronic circuit consisting essentially of a distance measuring scanner and a microcomputer. The distance measuring scanner works to emit laser beams frontward of a vehicle equipped with this system (will also be referred to as a system vehicle below) over a given angular range extending in a width-wise direction thereof and to receive radar echoes from a target (e.g., a preceding vehicle) to determine the angular position of and distance to the target. The distance measuring scanner also receives signals from the collision avoidance ECU 2 indicating the speed of the system vehicle and an estimated value of a curvature of a curve in a road on which the system vehicle is now traveling to determine a same lane probability that the target exists on the same traffic lane as the system vehicle and/or produce target type data on the type of the target (e.g., a vehicle, a non-vehicle, or an unidentified object), and/or target locus data on a locus of a travel path of the target. The determination of the curvature of the curved road and the same lane probability may be made in manners as taught in U.S. Pat. No. 5,710,565, issued on Jan. 20, 1998, assigned to the same assignee as that of this application, the disclosure of which is totally incorporated herein by reference. The distance measuring scanner also determines a relative speed between the system vehicle and the target and a relative acceleration derived by differentiating the relative speed with respect to time and outputs the same lane probability, the target type data, the target locus data, the target-to-distance, the relative speed, and the relative acceleration to the collision avoidance ECU 2 as preceding vehicle data. The laser sensor 6 also produces a self-diagnosis signal and outputs it to the collision avoidance ECU 2. Instead of the laser sensor 6, any other type of radar may be employed which emits electric waves such as millimeter waves.

The collision avoidance control system-also includes a vehicle speed sensor 10, an acceleration pedal position sensor 11, an electronic throttle actuator 12, a steering sensor 13, a yaw rate sensor 14, a brake pedal position sensor 15, a brake actuator 16, and a head-up display 17. The vehicle speed sensor 10 works to measure the traveling speed of the system vehicle. The acceleration pedal position sensor 11 works to measure a pedal effort or position of the accelerator pedal operated by a vehicle operator. The electronic throttle actuator 12 works to regulate a valve position of a throttle valve of the engine. The steering sensor 13 works to measure a steered angle of a steering wheel of the vehicle. The yaw rate sensor 14 works to measure a yaw rate acting on the vehicle body which indicates a cornering condition of the vehicle. The brake pedal position sensor 15 works to measure a position of a brake pedal of the vehicle. The brake actuator 16 works to control a braking force applied to road wheels of the vehicles.

The engine ECU 3 determines an actual speed of the system vehicle and the position of the accelerator pedal as functions of outputs of the vehicle speed sensor 10 and the accelerator pedal position sensor 11 and outputs signals indicative thereof to the collision avoidance ECU 2. The engine ECU 3 receives a collision avoidance control flag, a required deceleration signal, and a diagnosis signal, as will be described later in detail, produced by the collision avoidance ECU 2 to determine a required operating condition of the engine and provides a target throttle position signal to the electronic throttle actuator 12 determined as a function of the required operating condition of the engine.

The brake ECU 4 transmits the outputs of the steering sensor 13, the yaw rate sensor 14, and the brake pedal position sensor 15 to the collision avoidance ECU 2. The brake ECU 2 receives the collision avoidance control flag and the required acceleration signal from the collision avoidance ECU 2 to determine a required operating conditions of the engine and provides a brake control signal to the brake actuator 16 to control a wheel cylinder (W/C) pressure of a brake hydraulic circuit.

The meter ECU 5 receives information about the vehicle speed, an engine speed, a locked/unlocked condition of doors of the vehicle, and a shift range in an automatic transmission of the engine (i.e., the position of a shift lever) through the LAN communications bus and displays such parameters on meter indicators installed in an instrumental panel of the vehicle. The meter ECU 5 receives a collision avoidance warning flag, as will be described later in detail, and the diagnosis signal from the collision avoidance ECU 2 and indicates them on the head-up display 17.

The collision avoidance ECU 2 receives signals indicative of the vehicle speed (Vm) and the position of the accelerator pedal outputted from the engine ECU 3 and signals indicative of the steered angle (str-eng, S0), the yaw rate, and the position of the brake pedal from the brake ECU 4. When the collision avoidance control enable switch 8 is in the on-state, the collision avoidance ECU 2 determines a preceding vehicle to be tracked as a target based on the preceding vehicle data outputted from the laser sensor 6 and calculates the possibility of collision with the target. The collision avoidance ECU 2 also produces the collision avoidance warning flag indicative of the collision possibility, the collision avoidance control flag, the diagnosis signal, and the required deceleration signal used to control the braking force and outputs them to the ECUs 3, 4, and 5.

The collision avoidance warning flag indicates an on-state of warning control which turns on the warning buzzer 7. The collision avoidance control flag indicates an on-state of decelerating control which produces the braking force required to avoid accidental collision with the target or preceding vehicle.

Figure 2:
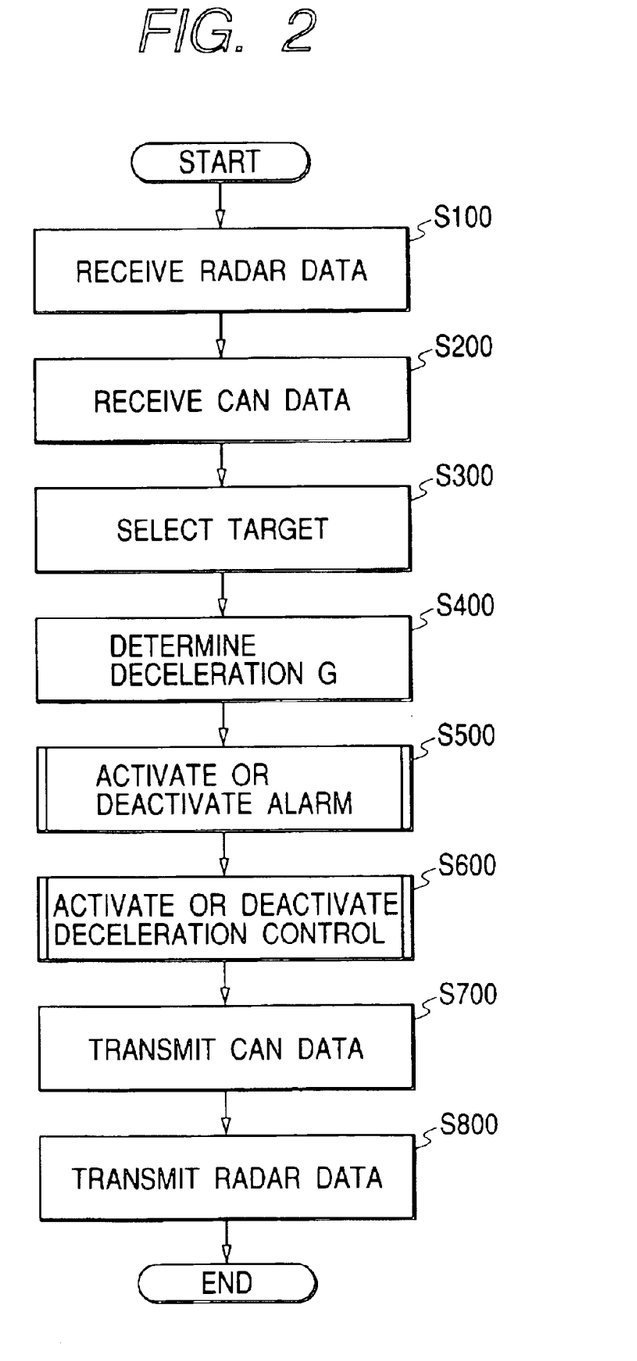
FIG. 2 is a flowchart of a deceleration control program executed in the collision avoidance control system, as illustrated in FIG. 1.

FIG. 2 shows logical steps or program executed in the collision avoidance ECU 2.

After entering the program, the routine proceeds to step 100 wherein radar information such as the preceding vehicle data is received from the radar sensor 6.

The routine proceeds to step 200 wherein CAN data such as the vehicle speed (Vm), the positions of the accelerator and brake pedals, the steered angle (str-eng, S0), and the yaw rate from the engine ECU 3 and the brake ECU 4.

The routine proceeds to step 300 wherein the radius of curvature R is estimated based on the steered angle (str-eng, S0), the yaw rate, and the vehicle speed (Vm), as derived in step 200, and a target to be tracked is determined based on the same lane probability, the target type data, and the target locus data contained in the radar information provided in step 100. Specifically, of objects whose same lane probability is greater than a given value, target type data indicates the vehicle or unidentified object, and target locus data indicates the approach to the system vehicle, the collision avoidance ECU 2 selects one which lies closest to the system vehicle as the target.

The routine proceeds to step 400 wherein the target selected in step 300 is determined as a preceding vehicle with which collision should be avoided, and a collision avoiding deceleration G is calculated according to an equation below.

$$G = V_r^2 / \{2 \times (D - D_{fin})\} - K_a \times A_f$$

where Vr is the relative speed between the target and the system vehicle, D is the distance to the target, Dfin is a minimum distance to the target that is to be reserved when the relative speed Vr becomes zero (0), Af is the acceleration of the target, and Ka is a gain ($0 \leq K_a \leq 1$). The target acceleration Af is determined by adding a relative acceleration Ar contained in the preceding vehicle data from the laser sensor 6 to an acceleration Am of the system vehicle determined by differentiating the vehicle speed Vm with respect to time.

The above equation is derived in the following manner. The location Pm of the system vehicle, the speed Vm of the system vehicle, the location Pf of the target, and the speed Vf of the target after the elapse of t seconds are determined by the following relations using the current location Pm0 of the system vehicle, the current speed Vm0 of the system vehicle, the current location Pf0 of the target, the current speed Vf0 of the target, and the current acceleration Am of the system vehicle.

$$Pm = Pm0 + Vm0 \cdot t + \tfrac{1}{2} \cdot Am \cdot t^2$$

$$Vm = Vm0 + Am \cdot t$$

$$Pf = Pf0 + Vf0 \cdot t + \tfrac{1}{2} \cdot Af \cdot t^2$$

$$Vf = Vf0 + Af \cdot t$$

The distance D and the relative speed Vr are given by the following equations using the current vehicle location Pm0, the current vehicle speed Vm0, the current target location Pf0, and the current target speed Vf0.

$$D = Pf0 - Pm0$$

$$Vr = Vf0 - Vm0$$

The avoidance of collision with the target may be achieved by decreasing the relative speed Vr to zero (0) before the distance D to the target reaches the minimum reserved distance Dfin. This condition is met by satisfying the following equations.

$$Pf - Pm = D_{fin}$$

$$Vf = Vm$$

By eliminating the time t from the above equations using the last two conditions, and substituting G for −A, we obtain $$G = Vr^2/\{2\times(D-Dfin)\} - Af$$

Specifically, the degree of deceleration required to reserve the minimum distance Dfin between the system vehicle and the target without the collision with the target is derived as G.

By multiplying the target acceleration Af by the gain Ka in order to modify the effects thereof on the collision avoiding deceleration G, we obtain the equation, as described above.

Specifically, in step 400, a minimum deceleration of the system vehicle required to decrease the relative speed Vr to zero (0) when the distance to the target matches with the minimum reserved distance Dfin is determined as the collision avoiding deceleration G.

Figure 3A:
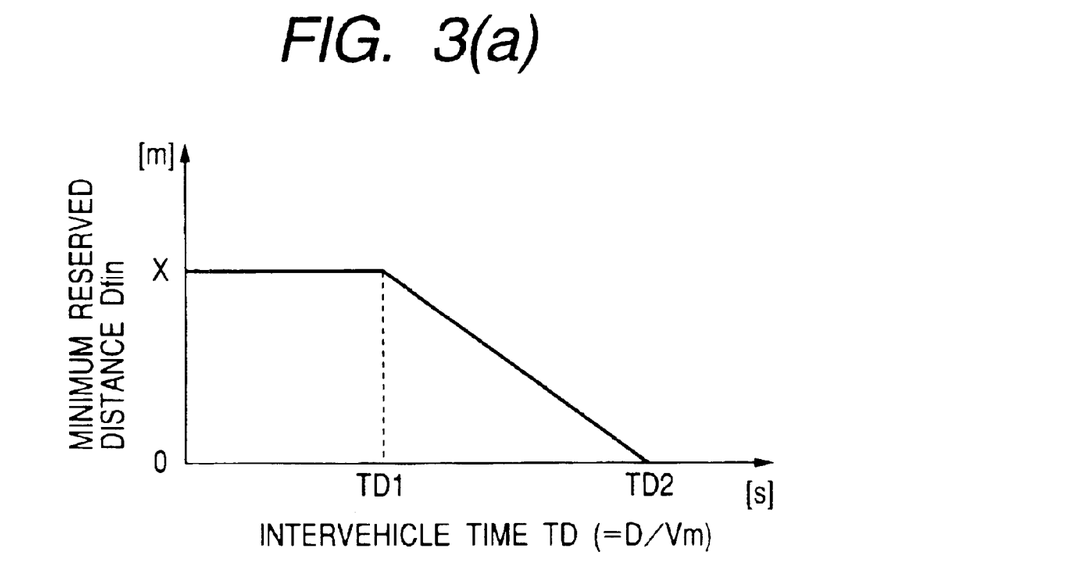
FIG. 3(a) is a graph which shows a minimum distance to be reserved between a system vehicle and a target object in terms of an intervehicle time.

The minimum reserved distance Dfin is, as shown in FIG. 3(*a*), determined variably as a function of an intervehicle time TD(=D/Vm). Specifically, when TD=0 to TD1 [sec.], the minimum reserved distance Dfin is kept at a constant value X (e.g., 2m). When TD=TD1 to TD2 [sec.], the minimum reserved distance Dfin is decreased proportional to an increase in Vm. When TD>TD2, the minimum reserved distance Dfin is set to zero (Dfin=0m).

Figure 3B:
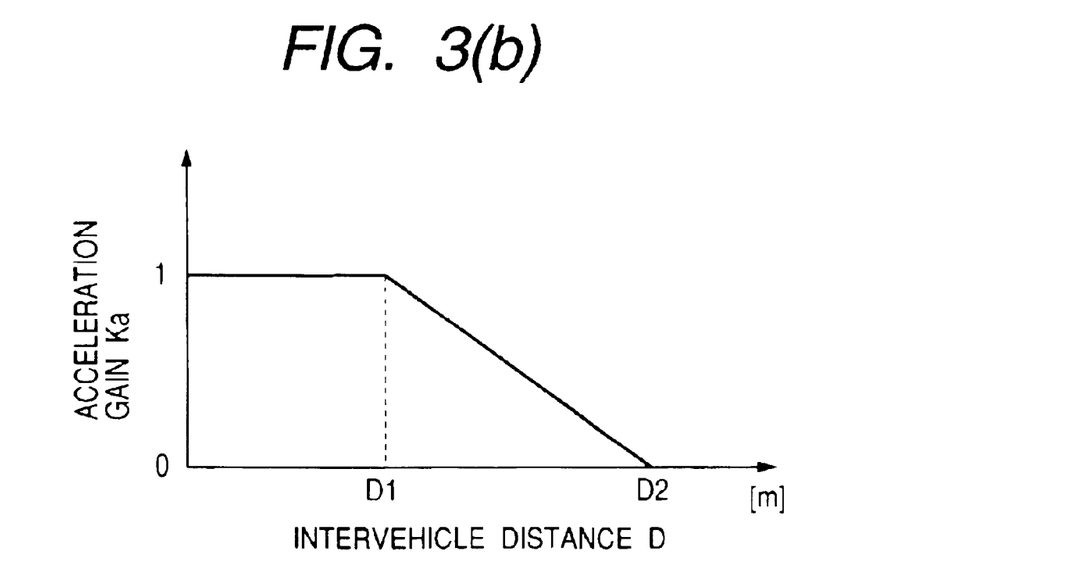
FIG. 3(b) is a graph which shows an acceleration gain used to determine a target collision avoiding deceleration in terms of the distance between a system vehicle and a target object.

The gain Ka is, as shown in FIG. 3(*b*), determined variably as a function of the intervehicle distance D. Specifically, when D=0 to D1 [m], the gain Ka is kept at a constant value of one (1). When D=D1 to D2 [m], the gain Ka is decreased proportional to an increase in D. When D>D2, the gain Ka is set to zero (Ka=0).

The minimum reserved distance Dfin may alternatively be determined as a function of one or some of the intervehicle distance D, an approach time D/|Vr|, the vehicle speed Vm, and the relative speed Vr. Similarly, the gain Ka may alternatively be determined as a function of one or some of the intervehicle time D/Vm, the approach time D/|Vr|, the vehicle speed Vm, and the relative speed Vr. In case of use of the vehicle speed Vm or the relative speed Vr, the minimum reserved distance Dfin and the gain Ka need to be determined as increasing with an increase in Vm or Vr.

After step 400, the routine proceeds to step 500 wherein a collision avoidance warning determination is made. The routine then proceeds to step 600 wherein a collision avoidance control determination is made. The determinations in steps 500 and 600 are achieved, as will be described later in detail, using the radar information, the CAN data, and the collision avoiding deceleration G, as derived in steps 100, 200, and 400.

After step 600, the routine proceeds to step 700 wherein the CAN data such as the collision avoidance warning flag, the collision avoidance control flag which indicate results of the determinations in steps 500 and 600, the required deceleration, and the diagnosis signal are transmitted to the engine ECU 3, the brake ECU 4, and the meter ECU 5. The routine proceeds to step 800 wherein data on the vehicle speed Vm and the estimated radius of curvature R is transmitted to the radar sensor 6.

Figure 4:
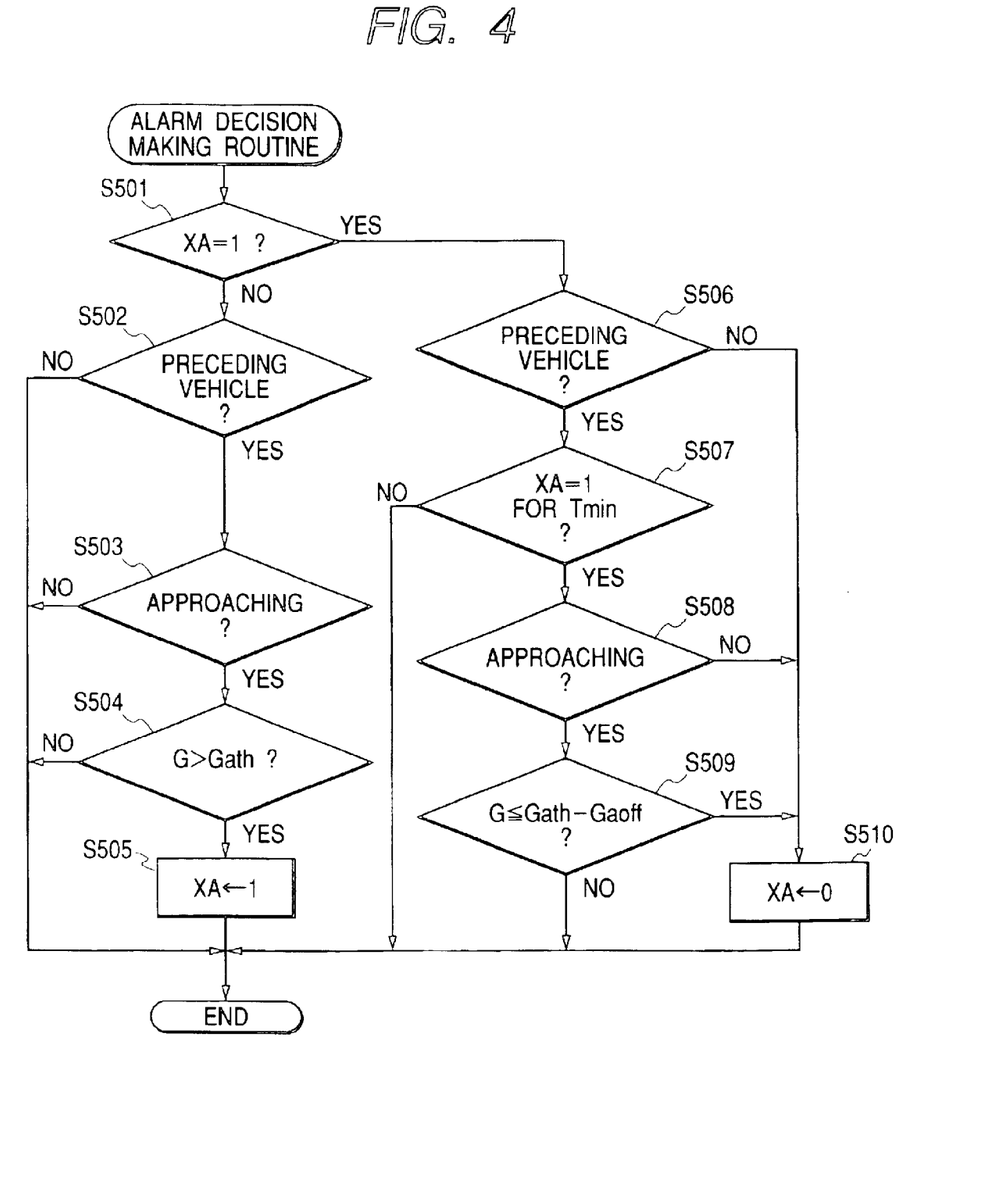
FIG. 4 is a flowchart of a sub-program executed in step 500 of the program in FIG. 2.

FIG. 4 shows a sub-program performed in step 500 of FIG. 3.

First, in step 501, it is determined whether the collision avoidance warning flag XA shows one (1) or not. When it is required to sound a collision alarm, the collision avoidance warning flag XA shows one (1). If a NO answer is obtained meaning that the collision avoidance warning flag XA does not indicate one (1), then the routine proceeds to steps 502 to 505 to determine whether conditions for sounding the collision alarm, that is, turning on the warning buzzer 7 are met or not.

Specifically, in step 502, it is determined whether the target preceding vehicle has been selected in step 300 or not. If a YES answer is obtained, then the routine proceeds to step 503 wherein it is determined whether the system vehicle is approaching the target preceding vehicle or not, that is, whether the relative speed Vr is less than zero or not (Vr<0). If a YES answer is obtained, then the routine proceeds to step 504 wherein it is determined whether the collision avoiding deceleration G is greater than a preselected alarm activating threshold value Gath or not. If a NO answer is obtained in either of steps 502, 503, and 504 meaning that the possibility that the system vehicle will start to be decelerated to avoid collision with the target preceding vehicle is low, the routine terminates without changing the collision avoidance warning flag XA.

If YES answers are obtained in all of steps 502, 503, and 504 meaning that the target preceding vehicle has been selected or tracked, the relative speed Vr is less than zero (0), and the collision avoiding deceleration G is greater than the preselected alarm activating threshold value Gath, then the routine proceeds to step 505 wherein the collision avoidance warning flag XA is set to one (1).

If a YES answer is obtained in step 501 meaning that the collision avoidance warning flag XA shows one (1), then the routine proceeds to steps 506 to 510 to determine whether conditions for deactivating the warning buzzer 7 are met or not.

Specifically, in step 506, it is determined whether the target preceding vehicle has been selected in step 300 or not. If a YES answer is obtained, then the routine proceeds to step 507 wherein it is determined whether the length of time the collision avoidance warning flag XA continues to show one (1) is greater than a predetermined minimum on-duration Tmin (e.g., one second) or not. The routine proceeds to step 508 wherein it is determined whether the system vehicle is approaching the target preceding vehicle or not, that is, whether the relative speed Vr is less than zero or not (Vr<0). If a YES answer is obtained, then the routine proceeds to step 509 wherein it is determined whether the collision avoiding deceleration G is less than or equal to the preselected alarm activating threshold value Gath minus a give value Gaoff(e.g., 0.5 m/s²) or not. If a NO answer is obtained in step 506 meaning that the target preceding vehicle has not been selected, or if the length of time the collision avoidance warning flag XA continues to show one (1) is greater than the predetermined minimum on-duration Tmin and the relative speed Vr is greater than or equal to zero (0) or the collision avoiding deceleration G is less than or equal to the preselected alarm activating threshold value Gath minus the give value Gaoff, meaning that the possibility that the vehicle will start to be decelerated to avoid collision with the target preceding vehicle has been lowered, the routine proceeds to step 510 wherein the collision avoidance warning flag XA is set to zero (0) and terminates.

If the above conditions are not satisfied meaning that the possibility that the vehicle will start to be decelerated to avoid collision with the target preceding vehicle is still high, the routine terminates without changing the collision avoidance warning flag XA.

Specifically, only when the collision avoidance warning flag XA is placed in a reset state showing zero (0), and the system vehicle is now approaching the target preceding vehicle, a determination of whether the collision avoidance warning flag XA is to be placed in a set state showing one (1) or not is made based on the collision avoiding deceleration G. Alternatively, when the collision avoidance warning flag XA is placed in the set state, but the target preceding vehicle is not selected, the collision avoidance warning flag XA is reset to zero (0). When the target preceding vehicle is selected or tracked, but the system vehicle is not approaching the target preceding vehicle, the collision avoidance warning flag XA is reset to zero (0). When the target preceding vehicle is tracked, and the system vehicle is approaching the target preceding vehicle, a determination of whether the collision avoidance warning flag XA is to be reset to zero (0) or not is made.

Once the collision avoidance warning flag XA is set to one (1), it is kept for the minimum on-duration Tmin as long as the target preceding vehicle is tracked by the radar sensor 6. The threshold value used to determine whether the collision avoidance warning flag XA is to be placed in the set state or the reset state has a hysteresis.

Figure 5:
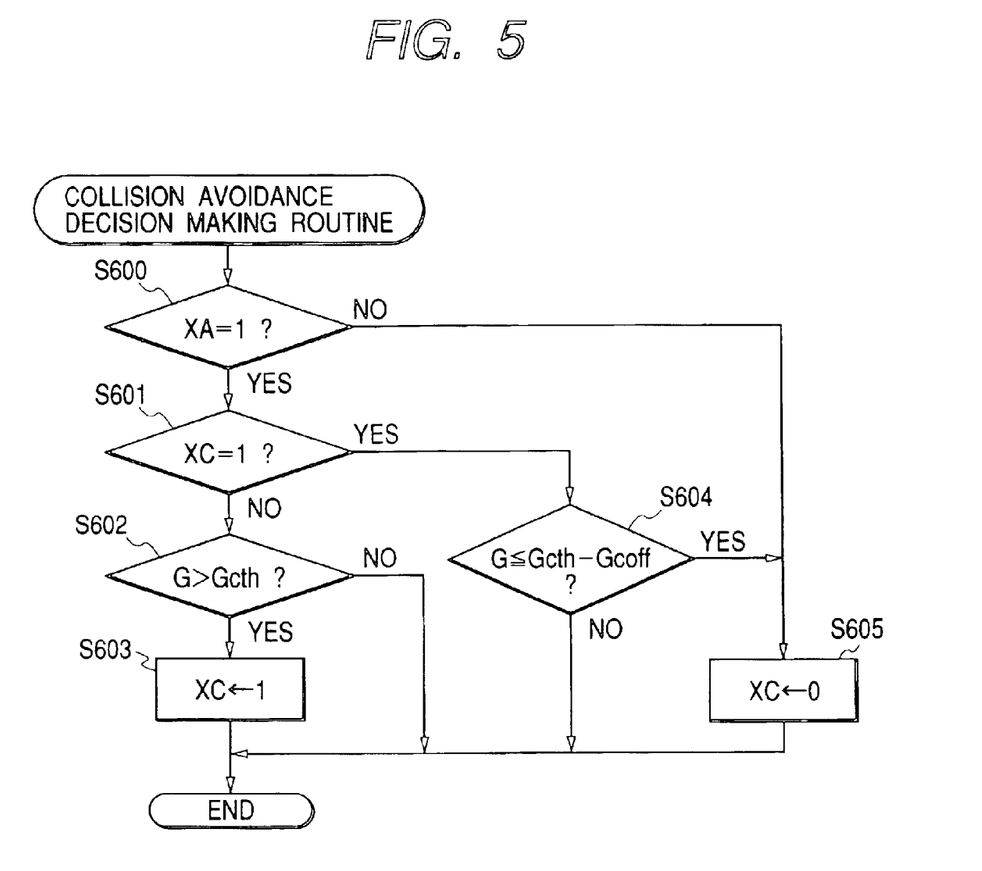
FIG. 5 is a flowchart of a sub-program executed in step 600 of the program in FIG. 2.

FIG. 5 shows a sub-program performed in step 600 of FIG. 2.

First, in step 600, it is determined whether the collision avoidance warning flag XA shows one (1) or not. If a NO answer is obtained, then the routine proceeds to step 605 wherein the collision avoidance warning flag XA is set to one (1) and terminates. Alternatively, if a YES answer is obtained, then the routine proceeds to step 601 wherein it is determined whether the collision avoidance control flag XC shows one (1) or not. If a NO answer is obtained, then the routine proceeds to steps 602 and 603 to determine whether conditions for initiating the deceleration control to avoid collision with the target preceding vehicle are met or not.

Specifically, in step 602, it is determined whether the collision avoiding deceleration G, as derived in step 400, is greater than a deceleration control activating threshold value Gcth or not which is greater than the preselected alarm activating threshold value Gath (e.g., Gcth=Gath+0.98[m/s$^2$]). If a NO answer is obtained (G≦Gcth) meaning that there is no need for decelerating the vehicle to avoid the collision with the target preceding vehicle, then the routine terminates without changing the collision avoidance control flag XC.

If a YES answer is obtained in step 601 meaning that the collision avoidance control flag XC is placed in the set state showing one (1), then the routine proceeds to step 604 to determine whether conditions for deactivating the deceleration control to avoid the collision with the target preceding vehicle are met or not.

Specifically, in step 604, it is determined whether the collision avoiding deceleration G is less than or equal to a deceleration control deactivating threshold value that is the deceleration control activating threshold value Gcth minus a predetermined value Gcoff (e.g., 0.5 m/s$^2$) or not. If a NO answer is obtained (G>Gcth−Gcoff) meaning that there is need for continuing the deceleration of the vehicle to avoid the collision with the target preceding vehicle, then the routine terminates. Alternatively, it a YES answer is obtained (G≦Gcth−Gcoff) meaning that the deceleration control should be deactivated, then the routine proceeds to step 605 wherein the collision avoidance control flag XC is reset to zero (0).

Specifically, when the collision avoidance warning flag XA is placed in the set state, the collision avoidance control flag XC is set to one (1) or reset to zero (1) based comparison between the collision avoiding deceleration G and a threshold value having a hysteresis.

The collision avoidance warning flag XA and the collision avoidance control flag XC thus determined are inputted to the warning buzzer 7 and also to the ECUs 3, 4, and 5 as the CAN data. Simultaneously, the collision avoiding deceleration G is also transmitted to the engine ECU 3 and the brake ECU 4.

Upon input of the collision avoidance warning flag XA placed in the set state, the warning buzzer 7 is activated to sound an alarm. Simultaneously, the meter ECU 5 visually produces a warning message urging the vehicle operator to depress the brake pedal on the head-up display 17.

Additionally, upon input of the collision avoidance control flag XC placed in the set state, the engine ECU 3 determines a target position of the throttle valve of the engine as a function of the required deceleration signal inputted from the collision avoidance ECU 2 and controls the electronic throttle actuator 12. Simultaneously, the brake ECU 4 determines a target W/C pressure as a function of the required deceleration signal inputted from the collision avoidance ECU 2 and controls the brake actuator 16. Specifically, when an actual deceleration of the vehicle is smaller than the required deceleration, the engine ECU 3 controls the electronic throttle actuator 12 to close the throttle valve of the engine. The brake ECU 4 controls the brake actuator 16 to increase the brake force applied to the road wheels of the vehicle.

Figure 6:
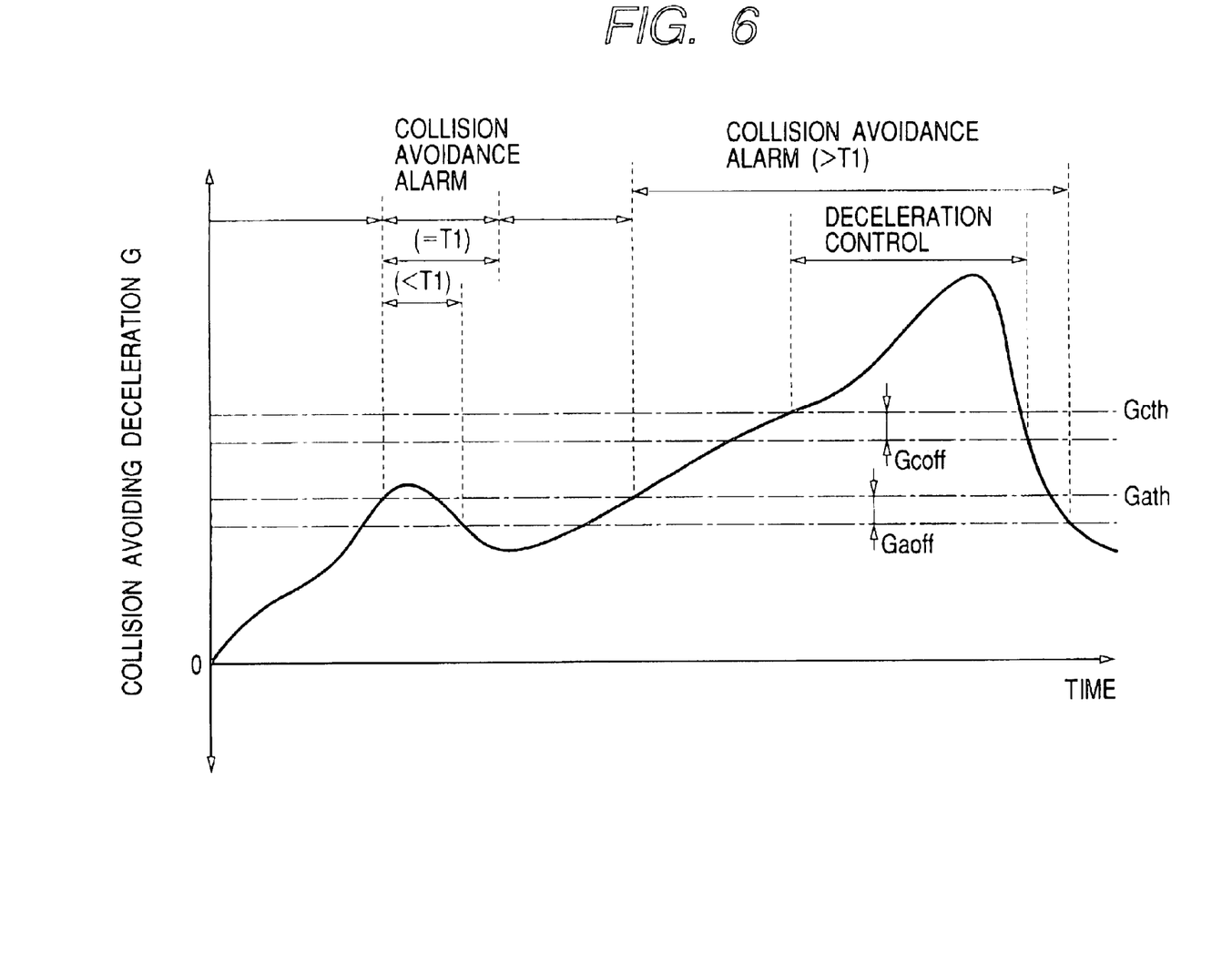
FIG. 6 is a time chart which shows an operation of the collision avoidance control system of FIG. 1.

FIG. 6 is a time chart which shows an operation of the collision avoidance control system.

When the collision avoiding deceleration G exceeds the alarm activating threshold value Gath, the warning buzzer 7 outputs the collision alarm. Afterward, when the collision avoiding deceleration G decreases below the alarm deactivating threshold value (Gath−Gaoff) without reaching the deceleration control activating threshold value Gcth, the warning buzzer 7 is deactivated to stop the alarm. However, when the time required for the collision avoiding deceleration G to decrease below the alarm deactivating threshold value (Gath−Gaoff) is smaller than the minimum on-duration Tmin, the warning buzzer 7 is kept on until the minimum on-duration Tmin expires.

When the collision avoiding deceleration G exceeds the deceleration control activating threshold value Gcth during output of the collision alarm, the deceleration control is initiated to avoid collision with the target preceding vehicle. Afterwards, when the collision avoiding deceleration G decreases below the deceleration control deactivating threshold value (Gcth−Gcoff), the deceleration control is deactivated to stop the deceleration of the system vehicle.

As apparent from the above discussion, the collision avoidance control system works to determine the collision avoiding deceleration G that is a minimum deceleration required to decrease the relative speed Vr to zero (0) until the distance to the target preceding vehicle reaches the minimum reserved distance Dfin, find the danger of possible collision with the target preceding vehicle based on the collision avoiding deceleration G, sound an alarm, and decelerate the vehicle as a function of the collision avoiding deceleration G when it is determined that the possibility of collision with the target preceding vehicle is high.

Specifically, the collision avoidance control system is so designed as to eliminate the need for a control variable used to decelerate the vehicle to avoid the collision with the target in addition to a criterion of determining the danger of possible collision with the target. In other words, the collision avoidance control system is capable of determining the control variable (i.e., deceleration) at a decreased operation load and with high accuracy.

The collision avoidance control system also works to decreases the minimum reserved distance Dfin and the gain Ka used to calculate the collision avoiding deceleration G as the intervehicle time TD and the intervehicle distance D increase. This causes the collision avoiding deceleration G to be restricted when the distance to the target preceding vehicle is great or the vehicle speed Vm is small enough to avoid the collision with the target preceding vehicle, that is, when it is possible for the vehicle operator to turn the steering wheel to avoid the collision with the target preceding vehicle, thus avoiding deceleration control with which the vehicle operator feels uncomfortable.

The collision avoidance control system may also be used with an adaptive cruise control (ACC) system which works to control the engine, gears, and brakes automatically to bring an actual acceleration of the system vehicle into agreement with a target one, as determined as functions of the distance to the target preceding vehicle, the relative speed between the target preceding vehicle and the system vehicle, and the speed of the system vehicle and to hold a suitable distance between the system vehicle and the target preceding vehicle. In this case, the collision avoidance control system preferably works to bring a lower limit of a target acceleration (i.e., an upper limit of a target deceleration) set by the ACC system into agreement with the alarm activating threshold value Gath. It is advisable that the lower limit of the target acceleration (i.e., the upper limit of the target deceleration) and the deceleration control activating threshold value Gcth have a great difference (e.g., 0.1G or more) therebetween which enables the vehicle operator to perceivably discriminate physical behavior of the vehicle body produced by an operation of the ACC system from that in the deceleration control by the collision avoidance control system. For instance, the deceleration control activating threshold value Gcth is preferably greater than the upper limit of the target deceleration by 0.1G or more. This enables the vehicle operator to recognize the facts that the system vehicle has encountered a condition where it is difficult for the ACC system to ensure the safety of the system vehicle and initiated the collision avoidance operation and also urges the vehicle operator to intervene in handling the system vehicle, thus resulting in improved traveling safety of the system vehicle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A collision avoidance control system for a vehicle comprising:
    a collision avoidance deceleration determining circuit working to determine a target collision avoidance deceleration required for a system vehicle equipped with this system to bring a relative speed between the system vehicle and a target object present ahead of the system vehicle into agreement with substantially zero without a physical collision with the target object; and
    a control circuit working to determine a possibility of collision with the target object as a function of the target collision avoidance deceleration, when the possibility of collision is higher than a given threshold level, said control circuit performing a predetermined collision avoidance operation.

2. A collision avoidance control system as set forth in claim 1, wherein said collision avoidance deceleration determining circuit determines the target collision avoidance deceleration G according to an equation below $$G = Vr^2/\{2\times(D-Dfin)\} - Ka \times Af$$

where Vr is the relative speed between the system vehicle and the target object, D is a distance to the target object, Dfin is a minimum distance to the target object that is to be reserved when the relative speed Vr becomes zero (0), Af is acceleration of the target object, and Ka is a gain ($0 \leq Ka \leq 1$).

3. A collision avoidance control system as set forth in claim 2, wherein said collision avoidance deceleration determining circuit decreases at least one of the minimum distance Dfin and the gain Ka as the distance D increases.

4. A collision avoidance control system as set forth in claim 2, wherein said collision avoidance deceleration determining circuit decreases at least one of the minimum distance Dfin and the gain Ka as one of a speed of the system vehicle and the relative speed Vr decreases.

5. A collision avoidance control system as set forth in claim 1, wherein when the target collision avoidance deceleration exceeds a preselected alarm activating threshold value, said control circuit activates an alarm to output an alarm signal, when the target collision avoidance deceleration decreases below a preselected alarm deactivating threshold value, said control circuit deactivating the alarm to stop the alarm signal.

6. A collision avoidance control system as set forth in claim 1, further comprising a travel control apparatus working to determine a target acceleration as functions of a distance to the target object and the relative speed and to decelerate or accelerate the system vehicle based on the target acceleration to control a travel condition of the system vehicle, and wherein the alarm activating threshold value is identical with a maximum deceleration controllable by the travel control apparatus.

7. A collision avoidance control system as set forth in claim 1, wherein when the target collision avoidance deceleration exceeds a preselected deceleration control activating threshold value, said control circuit performs deceleration control to decelerate the system vehicle, when the target collision avoidance deceleration decreases below a preselected deceleration control deactivating threshold value, said control circuit deactivating the deceleration control.

8. A collision avoidance control system as set forth in claim 7, further comprising a travel control apparatus working to determine a target acceleration as functions of a distance to the target object and the relative speed and to decelerate or accelerate the system vehicle based on the target acceleration to control a travel condition of the system vehicle, and wherein the deceleration control activating threshold value is set greater than a maximum deceleration controllable by the travel control apparatus.

9. A collision avoidance control system for a vehicle comprising:
    a collision avoidance deceleration determining circuit working to determine a target collision avoidance deceleration required for a system vehicle equipped with this system to bring a relative speed between the system vehicle and a target object present ahead of the system vehicle into agreement with substantially zero without a physical collision with the target object; and
    a control circuit working to determine a possibility of collision with the target object as a function of the target collision avoidance deceleration, said control circuit determining a controlled variable sequentially based on the possibility of collision which is required to avoid the physical collision with the target object and controlling a deceleration of the system vehicle as a function of the controlled variable.

10. A collision avoidance control system as set forth in claim 9, wherein said collision avoidance deceleration determining circuit determines the target collision avoidance deceleration G according to an equation below $$G = Vr^2/\{2 \times (D - Dfin)\} - Ka \times Af$$

where Vr is the relative speed between the system vehicle and the target object, D is a distance to the target object, Dfin is a minimum distance to the target object that is to be reserved when the relative speed Vr becomes zero (0), Af is acceleration of the target object, and Ka is a gain ($0 \leq Ka \leq 1$).

11. A collision avoidance control system as set forth in claim 10, wherein said collision avoidance deceleration determining circuit decreases at least one of the minimum distance Dfin and the gain Ka as the distance D increases.

12. A collision avoidance control system as set forth in claim 10, wherein said collision avoidance deceleration determining circuit decreases at least one of the minimum distance Dfin and the gain Ka as one of a speed of the system vehicle and the relative speed Vr decreases.

13. A collision avoidance control system as set forth in claim 9, wherein when the target collision avoidance deceleration exceeds a preselected alarm activating threshold value, said control circuit activates an alarm to output an alarm signal, when the target collision avoidance deceleration decreases below a preselected alarm deactivating threshold value, said control circuit deactivating the alarm to stop the alarm signal.

14. A collision avoidance control system as set forth in claim 13, further comprising a travel control apparatus working to determine a target acceleration as functions of a distance to the target object and the relative speed and to decelerate or accelerate the system vehicle based on the target acceleration to control a travel condition of the system vehicle, and wherein the alarm activating threshold value is identical with a maximum deceleration controllable by the travel control apparatus.

15. A collision avoidance control system as set forth in claim 9, wherein when the target collision avoidance deceleration exceeds a preselected deceleration control activating threshold value, said control circuit performs deceleration control to decelerate the system vehicle, when the target collision avoidance deceleration decreases below a preselected deceleration control deactivating threshold value, said control circuit deactivating the deceleration control.

16. A collision avoidance control system as set forth in claim 15, further comprising a travel control apparatus working to determine a target acceleration as functions of a distance to the target object and the relative speed and to decelerate or accelerate the system vehicle based on the target acceleration to control a travel condition of the system vehicle, and wherein the deceleration control activating threshold value is set greater than a maximum deceleration controllable by the travel control apparatus.

* * * * *